(12) United States Patent
Preisach

(10) Patent No.: US 7,650,079 B2
(45) Date of Patent: Jan. 19, 2010

(54) INTEGRATED OPTICAL TRANSCEIVER CIRCUIT

(75) Inventor: Helmut Preisach, Besigheim (DE)

(73) Assignee: Alcatel, Paris (FR)

( * ) Notice: Subject to any disclaimer, the term of this patent is extended or adjusted under 35 U.S.C. 154(b) by 1182 days.

(21) Appl. No.: 10/752,022

(22) Filed: Jan. 7, 2004

(65) Prior Publication Data

US 2004/0151073 A1 Aug. 5, 2004

(30) Foreign Application Priority Data

Feb. 5, 2003 (EP) .................................. 03360013

(51) Int. Cl.
*H04B 10/00* (2006.01)
(52) U.S. Cl. .................... 398/164; 398/149; 398/155
(58) Field of Classification Search ................ 398/149, 398/155, 203, 207, 212
See application file for complete search history.

(56) References Cited

U.S. PATENT DOCUMENTS 5,444,561 A * 8/1995 Kaminishi ................ 398/155
6,131,013 A * 10/2000 Bergstrom et al. ......... 455/63.1
6,295,152 B1 9/2001 Wedding 2002/0167707 A1 11/2002 Oomori et al.
2004/0091028 A1 * 5/2004 Aronson et al. ............. 375/219

FOREIGN PATENT DOCUMENTS

DE          100 13 790 A1      11/2001

OTHER PUBLICATIONS

Sherif M, Davies P. A: "Decision-point steering in optical fibre communication systems: theory" IEE Proc. J, Optelectron. IEE Proceedings J vol. 136, No. 3, Jun. 1989, pp. 169-176, XP001153732.
Hagimoto K et al: "Ultra-high-speed optical modulation and detection systems for long-haul fiber transmission" Discovering a New World of Communications. Chicago, Jun. 14-18, 1992. Bound together with B0190700, vol. 3, Proceedings of the International Conference on Communications, New York, IEEE, US, vol. 4, Jun. 14, 1992, pp. 719-724, XP010062018.

* cited by examiner

*Primary Examiner*—Dzung D Tran
(74) *Attorney, Agent, or Firm*—Sughrue Mion, PLLC

(57) ABSTRACT

An integrated transceiver contains a optical equalizer for a distorted O/E-converted signal, an adaptive regenerator coupled to the equalizer, and a clock recovery circuit coupled to the adaptive regenerator. The transceiver has further an embedded processing unit and an integrated programmable memory which stores software program. The processing unit is coupled to adjust threshold values of the adaptive regenerator according to a software algorithm loaded into the memory.

5 Claims, 4 Drawing Sheets

US 7,650,079 B2

INTEGRATED OPTICAL TRANSCEIVER CIRCUIT

The invention is based on a priority application EP 03360013.1 which is hereby incorporated by reference.

FIELD OF THE INVENTION

The present invention relates to the field of telecommunication and more particularly to a integrated transceiver circuit for use in high bit-rate applications.

BACKGROUND OF THE INVENTION

The recent evolution of data transmission has led to higher and higher bitrates. For long-haul digital transmission, optical transmission has long been preferred over electrical transmission, because of its lower losses and longer span lengths that can be bridged without signal regeneration. Now, the introduction of digitals signals at bitrates of 10 Gbit/s and more, requires to deploy optical transmission also for short range applications such as local area networking or inter-rack communication or even on-board optical signal transport. However, signal processing as such will remain electrical in most cases. This imposes a need for low-cost electrical transmitter and receiver components, which pre-process received optical signals and electrical signals to be transmitted optically.

Moreover, at bitrates of 10 Gbit/s and more, optical dispersion and other distorting effects in optical waveguides become predominant, thus requiring some sort of compensation techniques to restore a digital signal after optical transmission. FIG. 3 shows a classical approach of dispersion compensation in optical transmission systems. A dispersion compensation unit 303 is inserted after a fiber link 302 to compensate fiber distortion of an optical signal transmitted by an optical signal source 301. After dispersion compensation, the signal is fed to the actual optical receiver 304. Typical dispersion compensation units consist of one or more optical amplifier (e.g., EDFA) and a dispersion compensating fiber.

As a general rule, it can be said that the higher the bitrate, the shorter the maximum distance between two signal regenerators. On the other hand, signal distortion strongly depends on the type of waveguide used, e.g., single-mode or multimode silica fiber or plastic fiber. Typically, the different signal propagation conditions in different types of waveguides would lead to the development of different compensation units for the various waveguide types, which would increase development and production costs per unit.

It is therefore an object of the present invention to provide an integrated optical transceiver circuit capable to be used under different transmission conditions.

SUMMARY OF THE INVENTION

These and other objects that appear below are achieved by an integrated optical transceiver circuit according to claim 1.

In particular, the integrated transceiver contains a optical equalizer for a distorted O/E-converted signal, an adaptive regenerator coupled to the equalizer, and a clock recovery circuit coupled to the adaptive regenerator. The transceiver has further an embedded processing unit and an integrated programmable memory which stores software program. The processing unit is coupled to adjust threshold values of the adaptive regenerator according to a software algorithm loaded into the memory.

The invention has the advantage, that the same integrated circuit can be used in different applications by simply loading a new piece of software called firmware into the on-chip EEPROM, which defines the properties of the adaptive signal regenerator. Another very interesting advantage is that the transceiver can be upgraded to higher performance by loading a more sophisticated piece of software into the EEPROM. This way, the same transceiver chip can be offered as low-cost consumer product with only a basic set of functionality or as a premium product with more advanced functionality by simply changing the software.

BRIEF DESCRIPTION OF THE DRAWINGS

A preferred embodiment of the present invention will now be described with reference to the accompanying drawings in which.

DETAILED DESCRIPTION OF THE INVENTION

Figure 4:
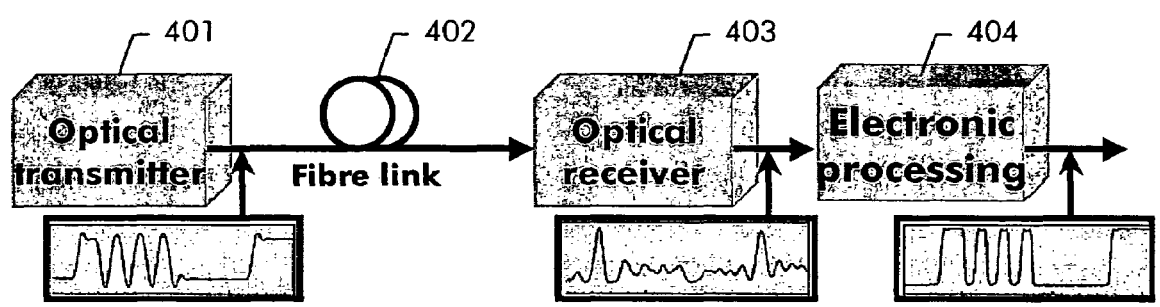
FIG. 4 shows the principle of signal recovery of an distorted optical signal.

A basic concept of the invention is to pre-process the distorted optical signal electronically. This is shown schematically in FIG. 4. An optical transmitter 401 generates an optical signal, which shape is shown in diagram 411. After transmission over a fiber link 402, the signal is received at an optical receiver 403, which performs optical-to-electrical conversion. The O/E-converted signal is represented in diagram 412. As can be seen from the schematic diagram, the signal is distorted, which is due to optical dispersion. After O/E-conversion, the distorted signal is fed to an electronic processing circuit 404, which recovers the original signal shape. This works, because dispersion does not destroy the information, but the information can be recovered by some kind of equalization.

According to the invention, O/E conversion and electrical signal recovery is performed in the interface of a receiving network element.

Figure 1:
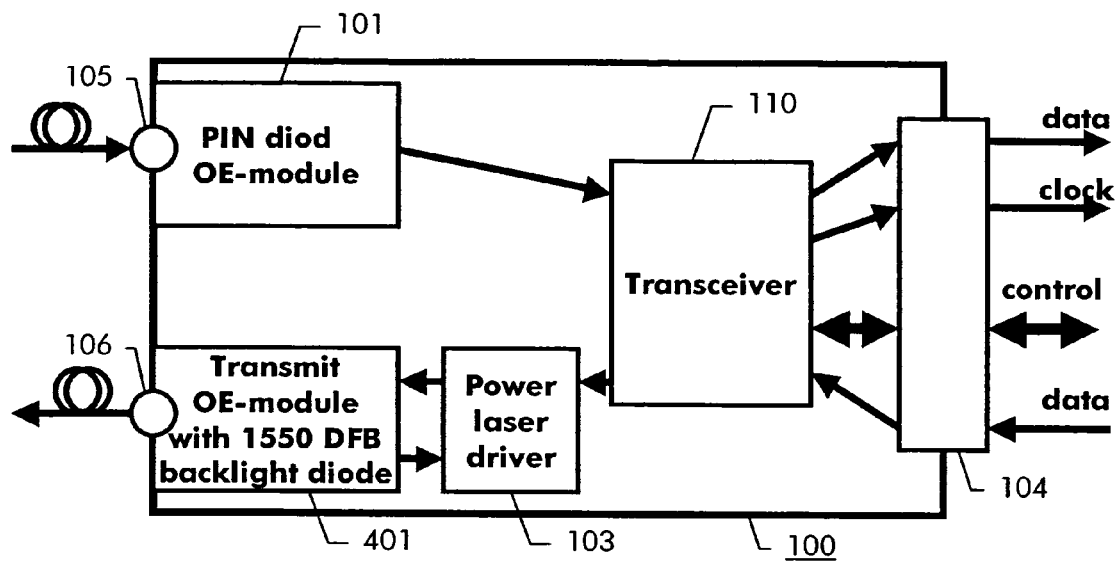
FIG. 1 shows an optical interface card with a transceiver chip.

FIG. 1 shows a block diagram of an optical interface board 100. It contains a first optical connector 105 for a receive-end optical fiber and a second optical connector 106 for a transmit-end optical fiber. Optical connector 105 leads to a PIN photodiode (PIN: positive-intrinsic-negative), which converts received optical signals into analogue electrical signals. The converted electrical signal is fed to an integrated transceiver 110. Optical connector 106 is connected to a laser module 102, i.e., a 1550 nm DFB laser with integrated backlight photodiode diode. The laser module 102 is connected to a power laser driver 103, which is in turn connected to the integrated transceiver 110. The laser module is a commonly available Vertical Cavity Surface Emitting Laser (VCSEL).

On the internal side, the interface board has an electrical connector 104, which has electrical data and clock output, electrical data input and a control interface, all connected to the electrical transceiver 110.

Figure 2:
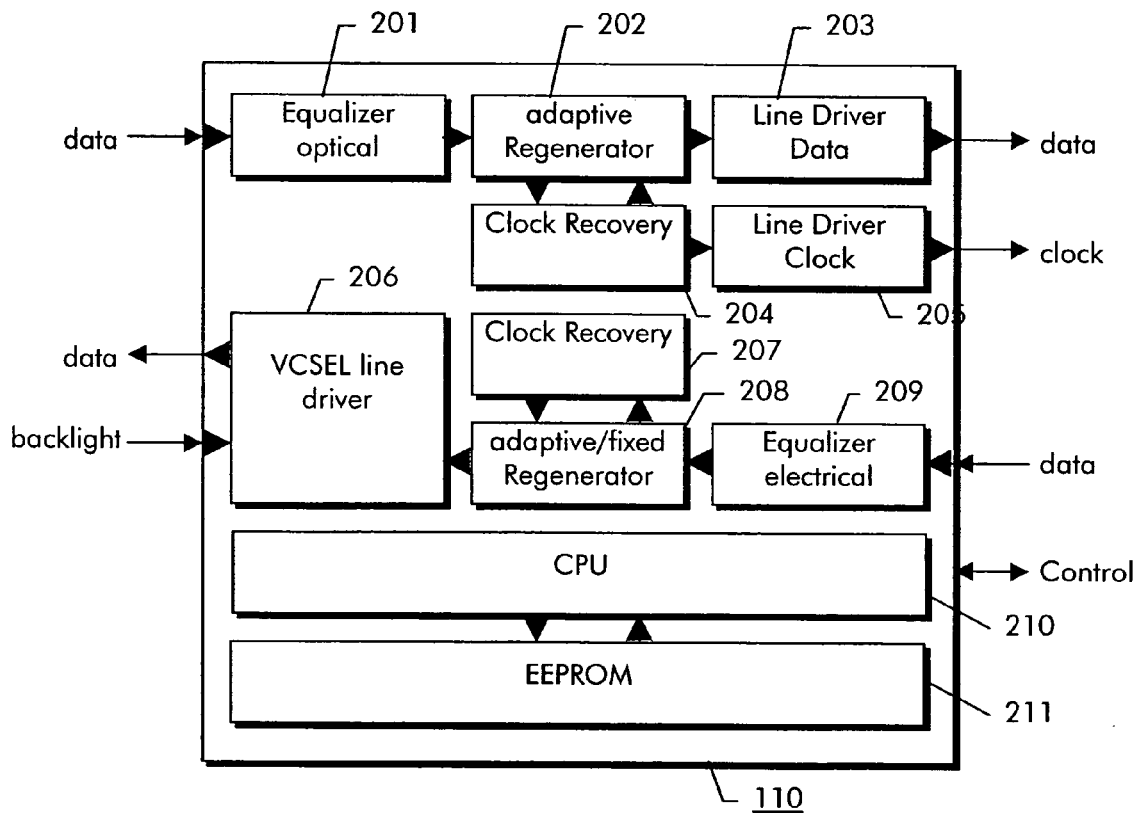
FIG. 2 shows a bock diagram of the transceiver.
Figure 3:
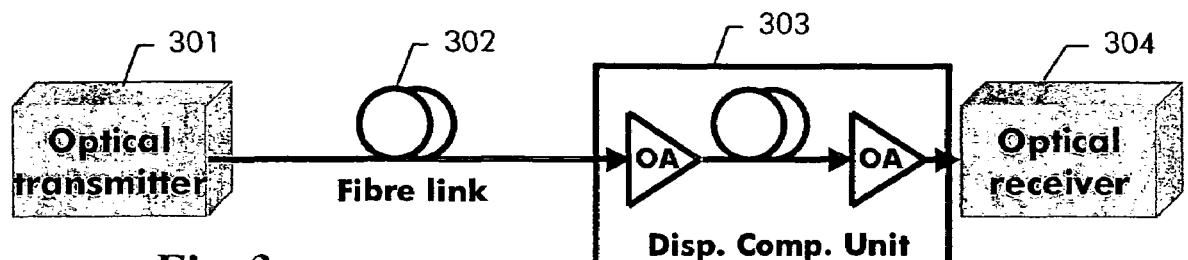
FIG. 3 shows the principle of optical dispersion compensation.

According to the invention, basically all electrical processing capabilities of the interface board are integrated into the single transceiver chip, to allow low cost production of the interface. The transceiver is shown in a block diagram in FIG. 2.

The data input from the PIN diode is connected to an equalizer 201, which leads to an adaptive regenerator 202. Regenerator 202 is connected to a clock recovery module 204 and to an electrical line driver 203 for the recovered output data signal. The clock recovery module 204 is connected to a second line driver 205 for a clock output.

In transmit direction, the data output to the power laser driver is connected to a VCSEL line driver. At the internal data input, an electrical equalizer 209 is provided, which leads to a regenerator 208. Regenerator 209 is connected to a clock recovery module 207 and to the VCSEL line driver.

The transceiver further contains an embedded CPU (central processing unit) and an EEPROM. The CPU may be an 8051 type CPU and is connected to the control interface.

In order to allow flexible operation in various fields of application, a basic idea of the present invention is to use in receive direction an adaptive regenerator and to control its operation by an embedded micro-controller 210. The behavior and characteristics of the transceiver con thus be adapted to the foreseen field of application by simply loading an appropriate firmware module into the on-chip EEPROM 211.

Electrical Equalizer

Figure 5:
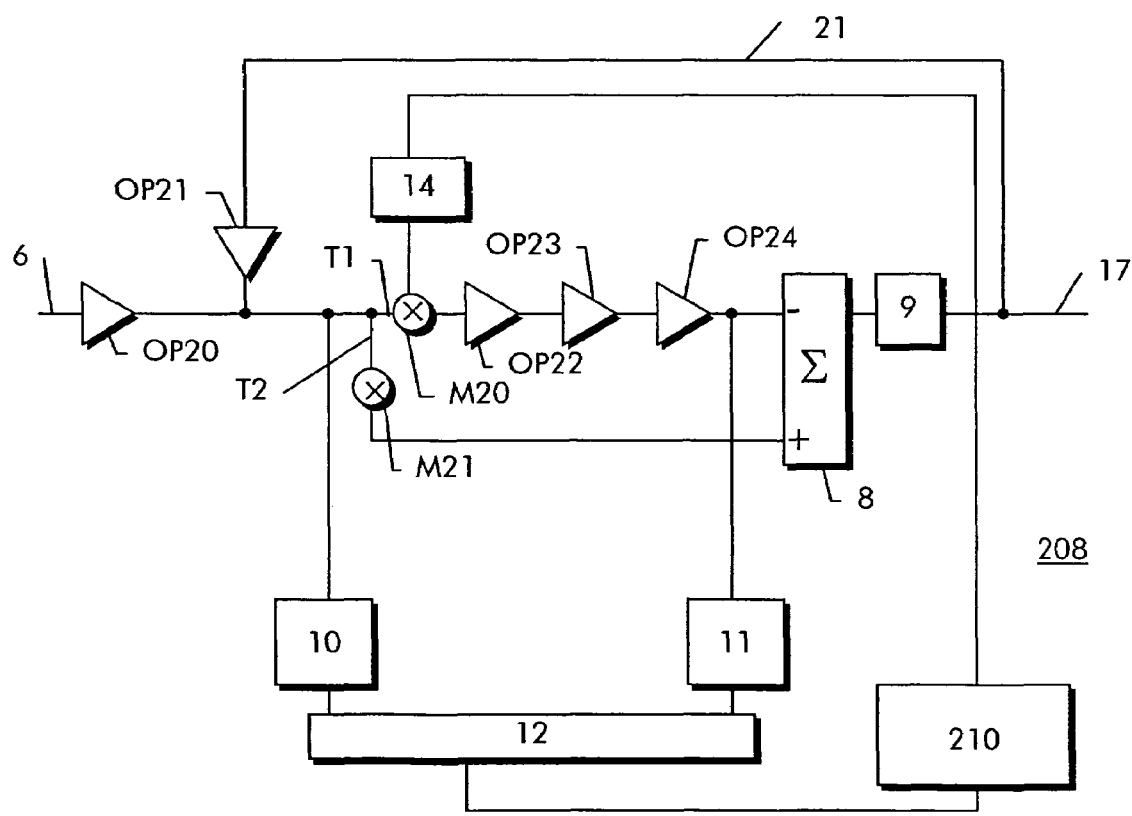
FIG. 5 shows a circuit diagram of an electrical equalizer.

The electrical equalizer 208 is shown in FIG. 5. Input signal 6 is first amplified by amplifier OP20. The amplified signal is fed to two taps T1, T2. Each tap contains a multiplier M20, M21, however, multiplier M21 in tap T1 is fixed to value 1 in this example. Multiplier M20 can be adjusted via control loop 14. Tap 1 is a delay line which contains three cascaded amplifiers OP22, OP23, and OP24 and has a delay in the range of about 100 ps. In the embodiment shown, the delay line has a delay of 94 ps. The amplifiers are simple differential buffer amplifiers, i.e., feedback-controlled current amplifier with a broadband frequency spectrum of up to 12 GHz and a delay of approximately 30 ps, each. The total amplification of the three amplifiers of the delay line is adjusted to the value 1.

Both tops are connected to an adder-subtractor 8. Tap T1 is connected to the inverted input and tap T2 to the non-inverted input of the adder-subtractor 8, so that the signal from tap T2 is subtracted from the signal from tap T1. The output of the adder-subtractor is fed to a limiter 9 at the signal output of the equalizer. The limiter 9 is a limiting amplifier which serves to adjust the total amplification of the equalizer to be greater than 1. Output 17 of the equalizer is fed to regenerator 208 in FIG. 2.

Peak detectors 10 and 11 measure the maximum pulse amplitude before and after the delay line of tap T1. The peak values are subject to A/D conversion by A/D-converter 12 and the digital values then evaluated by CPU 210 in order to determine a control signal to tune multiplier M20.

In addition, the output of the equalizer can be fed back to the input for test purposes via test loop 21 and amplifier OP21.

The equalizer is optimized to compensate electrical cable distortion of coax cables or backplanes that have a relatively smooth frequency response with low-pass characteristic, which is typically the case as long as there are no signal reflections. The frequency response of the equalizer is approximately a sinus curve, whereby the maximum value is controlled by multiplier M20 in tap T1 and the width of the curve depends on the delay value of tap T1. For 10 Gbit/s applications, the frequency response of the equalizer has its maximum at 5 GHz, i.e., approximately half the bitrate of interest because 5 GHz is the fundamental frequency of a signal operating at 10 Gbit/s. The frequency response of a coax cable for example, has typically a "sqrt(f)" shape, which can be approximated relatively well by the rising edge of the sinus shape. In other words, the rising edge of the sinus shaped frequency response curve of the equalizer is used to compensate the cable distortion for signals up to approximately 10 Gbit/s.

Via multiplier M20, the ration between input and output of tap T1 is adjusted. This ration depends on temperature and other external conditions. The control loop in tap T1 can thus be used to adapt the equalizer dynamically to changing conditions. However, it may also be sufficient to adjust tap T1 only once when switching the equalizer on and let the initial ration fixed afterwards.

During start of the equalizer, a static signal is fed via test loop 21 to the input of the equalizer and amplifier OP20 turned off (i.e., no external input signal). Peak detector 10 measures the static test input and peak detector 11 measured the output of tap T1. The peak detectors are realized with a capacitor that is charged with the input signal until its voltage reaches the maximum signal amplitude after approximately 0.5 µs. This peak measurement is cyclical, i.e., after a measurement cycle of about 2 µs, the voltage at the capacitor is reset to zero to start a new measurement cycle. Cyclical measurement is necessary to enable detection of a loss of the input signal, because if the peak detectors will not be reset, they would hold the maximum value, once fully charged, forever even when the input signal has long disappeared.

The results from the two peak detectors are fed via A/D-converter 12 to CPU 210. The CPU considers input and output peak values and determines according to a predefined optimization algorithm a scheduled value for the ratio. In the preferred embodiment, the scheduled ration is 0.3. When the equalizer is switched on, the CPU adjusts the ration between input and output of tap T1 in 10 steps. During normal operation, the CPU can continue to adjust the ration to changing temperature conditions in an on-line tracking process. This may be advantageous, if the cooling of the entire signal regenerator is insufficient and therefore temperature will change during operation.

Peak detector 10 has thus two functions. On the one hand, it detects loss of input signal and raises via logic circuit 13 a corresponding alarm and on the other hand, it serves to measure and adjust the ration between input and output of tap T1.

More details on the electrical equalizer can be found in co-pending the European patent application entitled "Electrical Signal Regenerator" by the same inventor and filed the same day as the present invention, which contents is incorporated by reference herein.

Optical Equalizer

The optical equalizer 201 is in principle similar to the electrical equalizer described above. Therefore, the circuit in FIG. 5 applies also to the optical equalizer. However, the individual values of the delay taps are adapted to typical dispersion values as they occur in OE-converted optical signals due to optical dispersion. Moreover, the failure results from the adaptive regenerator 202 are used to adjust the optical equalizer via the CPU for maximum eye opening.

Adaptive Regenerator

Figure 6:
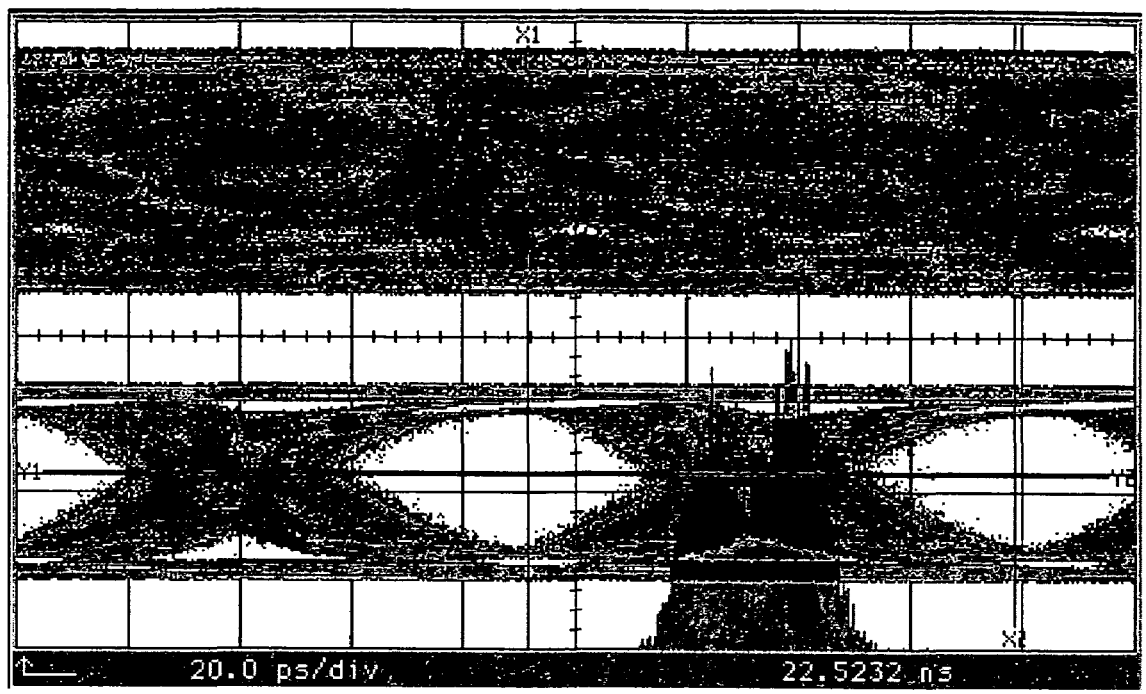
FIG. 6 shows an eye diagram before and after electrical equalization.

Generally, the adaptive regenerator 202 is a decision circuit which decides upon logical '1' or '0'. This is achieved by setting a threshold value so that logical '1' or '0' can be distinguished. An eye diagram of the received signal, before and after equalization is shown in FIG. 6. The received signal is shown in the upper part of the figure. Due to signal distortion along the transmission link, the eye is nearly closed. Equalization of the O/E converted signal re-opens the eye as shown in the lower part of the figure.

Conventional decision circuits use threshold values which lie approximately in the center of the eye diagram, so that the signal is sampled in the middle of its eye opening. Such a regeneration circuit is known for example from U.S. Pat. No. 5,251,238, which is incorporated by reference herein. However, the invention recognizes that due to non-linear optical effects which lead for example to pulse width modulation, the best decision point is not necessarily in the center of the eye. Therefore, the adaptive regenerator uses a so-called quality monitor to sample the eye diagram of the received and equalized signal and to optimize the sampling thresholds of the decision circuit.

Figure 7:
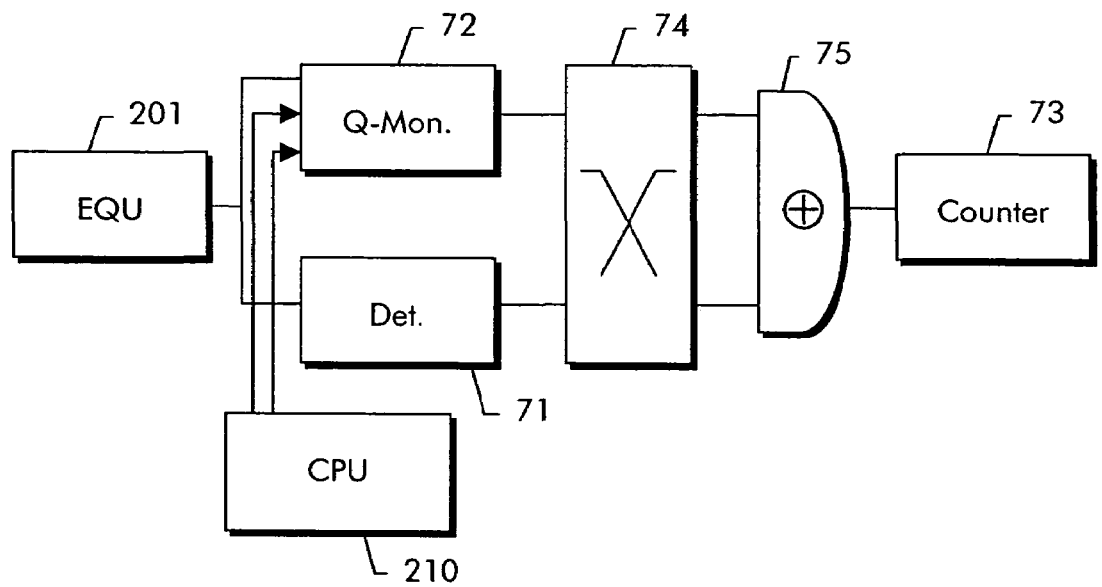
FIG. 7 shows a block diagram of an adaptive signal regenerator.

FIG. 7 shows a block diagram of the regenerator. The received signal is fed to two branches. A first branch contains the actual decision circuit 71 and the second branch leads to a monitor circuit 72, which is referred to a Q-monitor (quality monitor). The Q-monitor is a second decision circuit but which phase and amplitude threshold are adjustable by the CPU. By altering phase and amplitude threshold, the entire eye can be scanned by the Q-monitor. A comparator 84 compares the decision results of the first decider 71 and the Q-monitor. If these are different, an error counter 73 counts the event. Such events are referred to as pseudo errors. The CPU calculates then from the pseudo error rate which corresponds to a certain threshold value in the Q-monitor 72 an optimized threshold value for the decision circuit 71. An additional cross-over switch 84 allows to compare the signals on the two branches. The principle of the adaptive regenerator is disclosed in more detail in U.S. Pat. No. 6,295,152, which is incorporated by reference herein.

The algorithm for optimizing the threshold is as follows. First the CPU increases the amplitude threshold value of the Q-monitor to an upper value until pseudo error rate increases. Then the CPU decreases the amplitude threshold to a lower value until the pseudo error rate increases again. These two values correspond to the upper and lower edges of the eye diagram. From these two values, the CPU makes an extrapolation to find an optimized threshold value for the decision circuit 71. This extrapolation takes into account an assumption about the noise spectrum. For example in a given scenario the noise generated along the optical link is assumed to have a Gaussian distribution (or normal distribution) but the width of the Gaussian noise distribution is wider for logical '1' as for logical '0'. Based on this noise assumption, the CPU performs a double logarithmic extrapolation (log/log fit) to find the optimized threshold value.

After this first step, the CPU adjusts the phase value in the Q-monitor. Phase optimization can be performed similar to amplitude threshold adjustment by extrapolation. In addition, for the phase optimization a dithering method can be used, where the phase is dithered to find the edges of the eye and then perform an extrapolation to optimize the phase value for the decider 71. If required, threshold and phase optimization as described above can than be repeated iteratively.

Various algorithms are possible to find the best phase and threshold values for the decision circuit 71, which may also differ depending on the underlying assumptions for noise and distortion in the received signal. As the regenerator is controlled by the embedded CPU 210, different algorithms can be loaded to the EEPROM to change the behavior of the regenerator. Moreover, the error function can be used to adjust the equalizer via the CPU 210.

Regenerator 208 is in principle similar to the adaptive regenerator 202 but does not necessarily require as accurate control as the adaptive regenerator 202. Therefore, a decider with fixed threshold value would in principle suffice the requirements for the transmit side regenerator 208, as it only serves to reshape internal electrical signals before transmission.

Clock Recovery

The clock recovery circuits 204 and 207 are realized with a phase-locked loop (PLL). The PLL has a voltage-controlled oscillator, a loop filter, and a phase detector. The phase detector compares the phase of a recovered clock signal with the phase of the input signal and generates an error signal, which corresponds to the phase difference between the two. The loop filter generates two control signals from the error signal. It has a first loop that generates the first control signal, which serves to adjust the oscillator to dynamical phase shifts in the input signal and a second control loop, which generates the second control signal that adjusts the oscillator to long-term variations in the phase of input signal. The first loop is designed as an analogue circuit, while the second control loop is designed as a digital circuit.

Details of the phase-locked loop and the associated control circuitry, that detects if the PLL has locked, are disclosed in three co-pending European patent applications entitled "Phasenregelkreis, Übertragungstechnische Einheit, Erkennungsschaltung und Digital-Analog-Konverter", "Erkennungsschaltung, Phasenregelkreis, Übertragungstechnische Einheit und Digital-Analog-Konverter", and "Digital-Analog-Konverter, Phasenregelkreis, Übertragungstechnische Einheit und Erkennungsschaltung" by the same inventor and filed the same day as the present application, which contents is incorporated by reference herein.

VCSEL Line Driver

Figure 8:
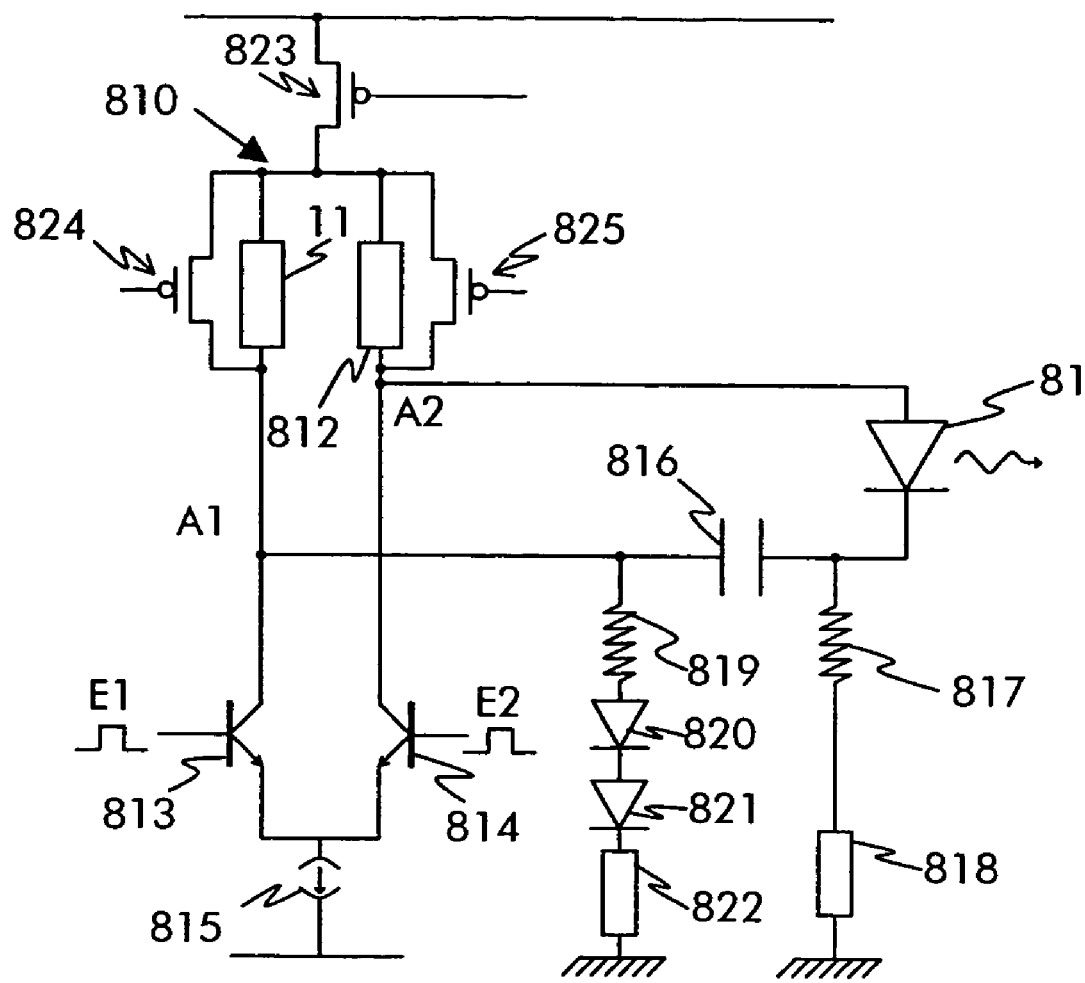
FIG. 8 shows a circuit diagram of the laser driver used in the transceiver.

As the integrated transceiver chip is designed for maximum flexibility, it contains a laser driver capable of driving various commonly available lasers of the VCSEL type. For example the VCSEL driver can drive a 850 nm VCSEL with a resistance of 60 Ω in single ended mode or a 1300 nm VCSEL with a resistance of 120 Ω in dual-ended or differential mode. A circuit diagram of the VCSEL line driver is shown in FIG. 8. The VCSEL line driver is described in more details in co-pending European patent application entitled "VCSEL-Ansteuerschaltung" by the same inventor and filed the same day as the present invention, which contents is incorporated by reference herein.

Having described by way of non-limiting examples various embodiments of the present invention, it will be clear to those skilled in the art, that the invention is not restricted to implementation details and particular figures given in these embodiments. Conversely, those skilled in the art would appreciate that several changes, substitutions and alterations can be made without departing from the concepts and spirit of the invention.

What is claimed is:

1. An integrated transceiver comprising:
    a first equalizer for a distorted O/E-converted optical signal;
    an adaptive regenerator coupled to the equalizer;
    a clock recovery circuit coupled to the adaptive regenerator;
    an embedded processing unit; and
    an integrated programmable memory for storing different pieces of software;
    wherein said processing unit adjusts threshold values of said adaptive regenerator according to a software algorithm loaded into said memory.

2. The integrated transceiver according to claim 1, wherein said processing unit is further adapted to adjust said first equalizer under control of said software algorithm according to an error function determined by the adaptive regenerator.

3. The integrated transceiver according to claim 1, further comprising:
    a second equalizer for electrical signals to be transmitted;
    a second regenerator coupled to said second equalizer; and
    a laser driver coupled to said second regenerator.

4. The integrated transceiver according to claim 1, wherein said adaptive regenerator comprises:
    a decision circuit;
    a quality monitor; and
    a pseudo error counter, wherein said processing unit adjusts phase and threshold values of said decision circuit according to said software algorithm using said quality monitor and pseudo error counter to determine optimized phase and threshold values.

5. The integrated transceiver according to claim 1, further comprising electrical line drivers for a regenerated electrical signal and a recovered clock signal.

* * * * *